(12) United States Patent
Tsai

(10) Patent No.: US 12,535,706 B2
(45) Date of Patent: Jan. 27, 2026

(54) OPTICAL SHEET LAMINATE, BACKLIGHT UNIT, LIQUID CRYSTAL DISPLAY DEVICE, INFORMATION EQUIPMENT, AND PRODUCTION METHOD FOR BACKLIGHT UNIT

(71) Applicant: KEIWA Incorporated, Tokyo (JP)

(72) Inventor: Chengheng Tsai, Tokyo (JP)

(73) Assignee: KEIWA Incorporated, Tokyo (JP)

( * ) Notice: Subject to any disclaimer, the term of this patent is extended or adjusted under 35 U.S.C. 154(b) by 0 days.

(21) Appl. No.: 18/794,749

(22) Filed: Aug. 5, 2024

(65) Prior Publication Data

US 2024/0393641 A1 Nov. 28, 2024

Related U.S. Application Data

(63) Continuation of application No. 18/604,247, filed on Mar. 13, 2024, now Pat. No. 12,085,807, which is a
(Continued)

(30) Foreign Application Priority Data

Sep. 28, 2021 (JP) ................................. 2021-157806
Jun. 22, 2022 (JP) ................................. 2022-100220

(51) Int. Cl.
*G02F 1/00* (2006.01)
*G02F 1/1335* (2006.01)
*G02F 1/13357* (2006.01)

(52) U.S. Cl.
CPC .. *G02F 1/133607* (2021.01); *G02F 1/133603* (2013.01); *G02F 1/133611* (2013.01)

(58) Field of Classification Search
None
See application file for complete search history.

(56) References Cited

U.S. PATENT DOCUMENTS

| 2010/0033957 A1 | 2/2010 | Lin |
| 2018/0180794 A1 | 6/2018 | Harada |

(Continued)

FOREIGN PATENT DOCUMENTS

| CN | 111656268 A | 9/2020 |
| CN | 117561462 A | 2/2024 |

(Continued)

OTHER PUBLICATIONS

International Search Report and Written Opinion for PCT/JP2022/025924 mailed Aug. 16, 2022 w/English translation.
(Continued)

*Primary Examiner* — Gerald J Sufleta, II
(74) *Attorney, Agent, or Firm* — JCIPRNET

(57) ABSTRACT

An optical sheet laminate 100 to be incorporated into a backlight unit 40 includes a plurality of diffusion sheets 43 having a first surface 21a having a plurality of recesses 22 having a substantially inverted polygonal pyramid shape, and a pair of prism sheets 44 and 45 having prism extending directions perpendicular to each other. An arrangement direction of the recesses 22 of one of the plurality of diffusion sheets 43 closest to the prism sheets 44 and 45 intersects with the prism extending directions at an angle of 0° or more and 20° or less, or 70° or more and 90° or less.

8 Claims, 10 Drawing Sheets

Related U.S. Application Data continuation of application No. PCT/JP2022/025924, filed on Jun. 29, 2022.

(56) References Cited

U.S. PATENT DOCUMENTS

| | | | |
|---|---|---|---|
| 2019/0049790 A1* | 2/2019 | Okabe | G02F 1/133504 |
| 2019/0221724 A1* | 7/2019 | Song | C09K 11/70 |
| 2020/0292881 A1* | 9/2020 | Tsai | G02F 1/133611 |
| 2020/0341335 A1 | 10/2020 | Tsai et al. | |
| 2022/0004058 A1 | 1/2022 | Tsai et al. | |
| 2022/0326571 A1 | 10/2022 | Tsai et al. | |
| 2022/0334431 A1* | 10/2022 | Xu | G02F 1/133611 |
| 2023/0229040 A1 | 7/2023 | Park | |
| 2024/0152005 A1 | 5/2024 | Tsai | |

FOREIGN PATENT DOCUMENTS

| | | |
|---|---|---|
| CN | 117769668 A | 3/2024 |
| EP | 4075189 A1 | 10/2022 |
| JP | 2011-129277 A | 6/2011 |
| KR | 10-2006-0122308 | 11/2006 |
| TW | 201024809 A | 7/2010 |
| WO | WO 2010/010840 A1 | 1/2010 |
| WO | WO 2020/100390 A1 | 5/2020 |

OTHER PUBLICATIONS

Extended European Search Report for EP Patent Application No. 22875522.9 dated Nov. 7, 2024 (38 pages).

U.S. Appl. No. 18/604,247, Mar. 13, 2024, 2024/0248347 A1, Allowed.

3M Display Materials and Systems Division—3M Brightness Enhancement Film, 3M™ Brightness Enhancement Film (BEF 2 T 155n and BEF 4 GT 90/24), 3M™ Brightness Enhancement Film (BEF3 T 155n and BEF3 M2 155n), Application Guidelines, Jan. 10, 2018 (4 pages).

* cited by examiner

FIG.6
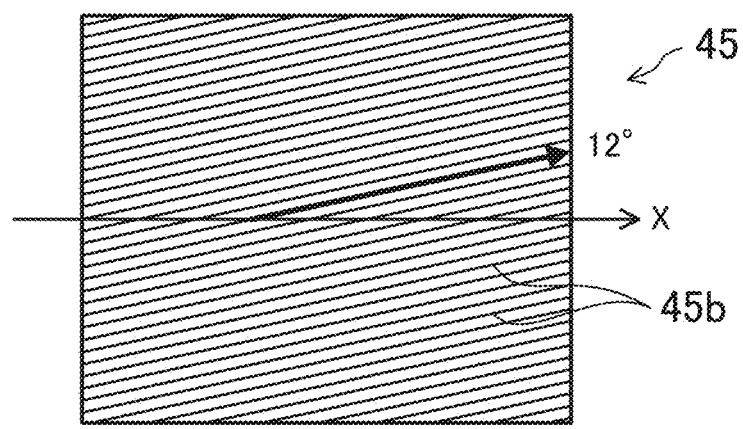
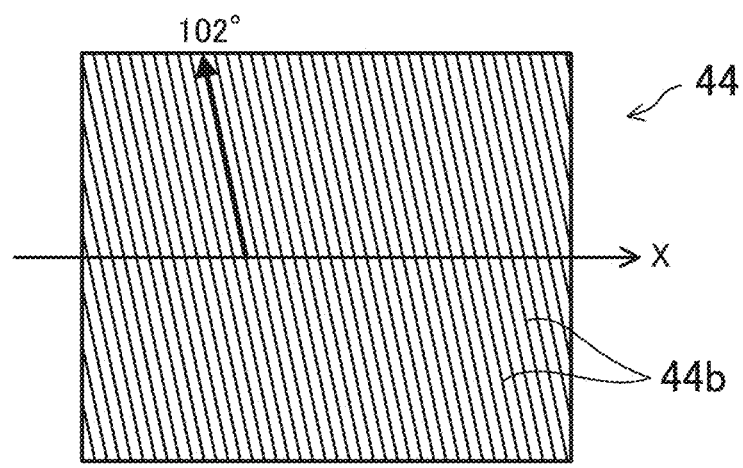
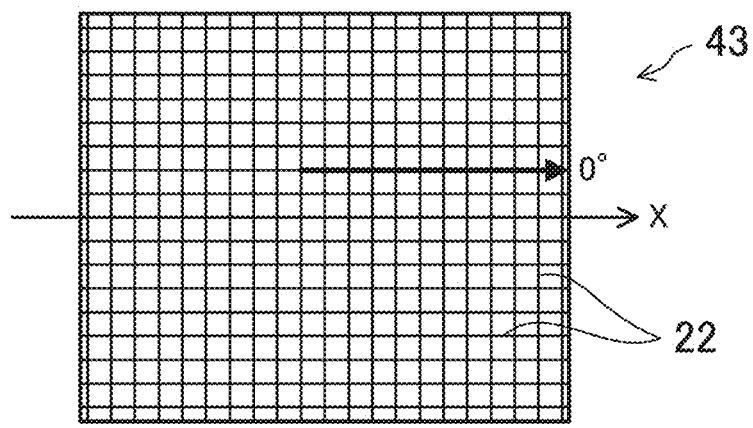

OPTICAL SHEET LAMINATE, BACKLIGHT UNIT, LIQUID CRYSTAL DISPLAY DEVICE, INFORMATION EQUIPMENT, AND PRODUCTION METHOD FOR BACKLIGHT UNIT

CROSS REFERENCE TO RELATED APPLICATIONS

This application is continuation of U.S. application Ser. No. 18/604,247, filed Mar. 13, 2024, which is a bypass continuation of International Application No. PCT/JP2022/025924, filed Jun. 29, 2022, which international application claims priority to and the benefit of Japanese Application No. 2021-157806, filed Sep. 28, 2021, and Japanese Application No. 2022-100220, filed Jun. 22, 2022; the contents of all of which are hereby incorporated by reference herein in their respective entireties.

BACKGROUND

The present disclosure relates to an optical sheet laminate, a backlight unit, a liquid crystal display device, an information apparatus, and a method for manufacturing the backlight unit.

In recent years, liquid crystal display devices (hereinafter referred to as liquid crystal displays in some cases) have been widely used as display devices for various information apparatuses such as smartphones and tablet terminals. A major type of a backlight of a liquid crystal display, which requires high luminance and high contrast, is a direct type in which light sources are arranged on a back surface of a liquid crystal panel.

When the direct-type backlight is adopted, an optical sheet such as a diffusion sheet or a prism sheet is used to diffuse light emitted from a light source such as a light emitting diode (LED) to improve uniformity of luminance and chromaticity over the entire screen (e.g., see Patent Document 1: Japanese Unexamined Patent Publication No. 2011-129277).

A direct-type backlight unit for a liquid crystal display such as a laptop computer or a tablet computer is used with, e.g., a diffusion sheet having two-dimensionally arranged recesses having an inverted pyramid shape, where two prism sheets having prism ridges perpendicular to each other are usually arranged above the diffusion sheet (i.e., closer to a display screen).

SUMMARY

Portable information equipment such as a laptop computer or a tablet computer intended to be carried around and used requires a thin sheet laminate configuration having high luminance uniformity. However, since each product has its own arrangement of point light sources and its own positional relationship among optical sheets, some products having a typical optical sheet laminate configuration have been unable to achieve sufficient luminance uniformity.

It is an object of the present disclosure to provide an optical sheet laminate that enables improvement in the luminance uniformity of a backlight unit.

To achieve the object, an optical sheet laminate to be incorporated into a backlight unit includes a plurality of diffusion sheets each having surfaces, at least one of which has a plurality of recesses having a substantially inverted quadrangular pyramid shape and arranged in a two-dimensional matrix; and a pair of prism sheets having prism extending directions perpendicular to each other. A first arrangement direction of the plurality of recesses of a first diffusion sheet that is one of the plurality of diffusion sheets closest to the pair of prism sheets intersects with the prism extending directions at an angle of 0° or more and 20° or less, or 70° or more and 90° or less.

The optical sheet laminate of the present disclosure includes the plurality of diffusion sheets in layer (hereinafter referred to as pyramid sheets in some cases), where each diffusion sheet has surfaces, one of which has the plurality of recesses having a substantially inverted quadrangular pyramid shape. Thus, the luminance uniformity of the backlight unit can be improved. Further, the arrangement directions of the recesses of the first diffusion sheet that is one of the plurality of diffusion sheets closest to the pair of prism sheets intersect with the prism extending direction at an angle of 0° or more and 20° or less, or 70° or more and 90° or less. Thus, with the same light source, the same electric power, and the same optical sheet laminate configuration, the luminance uniformity of the backlight unit is more improved than with intersection at another range of angles.

In the optical sheet laminate of the present disclosure, a second arrangement direction of the plurality of recesses of a second diffusion sheet that is at least one of the plurality of diffusion sheets excluding the first diffusion sheet may be substantially the same as the first arrangement direction. Thus, the luminance uniformity of the backlight unit can be further improved according to the conditions such as the arrangement of the point light sources, the positional relationship among the optical sheets, and the like. In the present disclosure, the expression "the direction is substantially the same" means that the angle difference between the two directions is 5° or less, preferably 3° or less, and more preferably 1° or less.

In the optical sheet laminate of the present disclosure, a second arrangement direction of the plurality of recesses of a second diffusion sheet that is at least one of the plurality of diffusion sheets excluding the first diffusion sheet may be different from the first arrangement direction. Thus, the luminance uniformity of the backlight unit can be further improved according to the conditions such as the arrangement of the point light sources, the positional relationship among the optical sheets, and the like. In the present disclosure, the expression "the direction is different" means that the angle difference between the two directions is greater than 5°, and preferably 10° or more.

A backlight unit of the present disclosure to be built in a liquid crystal display device and leading light emitted from light sources toward a display screen includes the optical sheet laminate of the present disclosure between the display screen and the light sources. The plurality of diffusion sheets are arranged between the light sources and the pair of prism sheets.

The backlight unit of the present disclosure includes the optical sheet laminate of the present disclosure, and thus the luminance uniformity can be improved.

In the backlight unit of the present disclosure, the light sources may be arranged on a reflection sheet provided on an opposite side of the display screen when viewed from the plurality of diffusion sheets. This causes multiple reflections between the diffusion sheets and the reflection sheet thus causing further light diffusion, and thus the luminance uniformity is further improved.

In the backlight unit of the present disclosure, the distance between the light sources and the plurality of diffusion sheets may be 5 mm or less, preferably 2.5 mm or less, and more preferably 1 mm or less. Thus, the backlight unit can be downsized.

A liquid crystal display device of the present disclosure includes the backlight unit of the present disclosure and a liquid crystal display panel.

The liquid crystal display device of the present disclosure includes the backlight unit of the present disclosure, and thus the luminance uniformity can be improved.

An information apparatus of the present disclosure includes the liquid crystal display device of the present disclosure.

The information apparatus of the present disclosure includes the liquid crystal display device of the present disclosure, and thus the luminance uniformity can be improved.

A method of the present disclosure for manufacturing a backlight unit to be built in a liquid crystal display device and leading light emitted from light sources toward a display screen includes arranging a plurality of diffusion sheets between the light sources and the display screen, where the diffusion sheets each have surfaces, at least one of which has a plurality of recesses having a substantially inverted quadrangular pyramid shape and arranged in a two-dimensional matrix; and arranging a pair of prism sheets between the plurality of diffusion sheets and the display screen, where the pair of prism sheets have prism extending directions perpendicular to each other. In arranging the plurality of diffusion sheets, luminance uniformity is evaluated with various intersecting angles between an arrangement direction of the plurality of recesses of each of the plurality of diffusion sheets and the prism extending directions; and based on an evaluation result, the arrangement direction of the plurality of recesses of each of the plurality of diffusion sheets is determined.

The method of the present disclosure for manufacturing a backlight unit includes arranging the plurality of diffusion sheets, where the luminance uniformity is evaluated with various intersecting angles between an arrangement direction of the recesses of each of the diffusion sheets and the prism extending directions; and based on an evaluation result, the arrangement direction of the recesses of each of the diffusion sheets is determined. Thus, the arrangement direction of the recesses of each of the diffusion sheets can be set to improve the luminance uniformity.

The present disclosure can provide an optical sheet laminate that enables improvement in the luminance uniformity of a backlight unit.

BRIEF DESCRIPTION OF THE DRAWINGS

FIG. 6 is a diagrams showing arrangement angles of the diffusion sheet (pyramid sheet) and the prism sheets in the optical sheet laminate of Example 1.

DETAILED DESCRIPTION

Embodiment

An optical sheet laminate, a backlight unit, a liquid crystal display device, an information apparatus, and a method for manufacturing the backlight unit of an embodiment will be described below with reference to the drawings. Note that the scope of the present disclosure is not limited to the following embodiments, and may be altered in any way within the scope of the technical concept of the present disclosure. Further, since each figure is for explaining the concept of the present disclosure, the dimensions, ratios, or numbers may be exaggerated or simplified as necessary for the sake of easier understanding.

Configuration of Liquid Crystal Display Device

Figure 1:
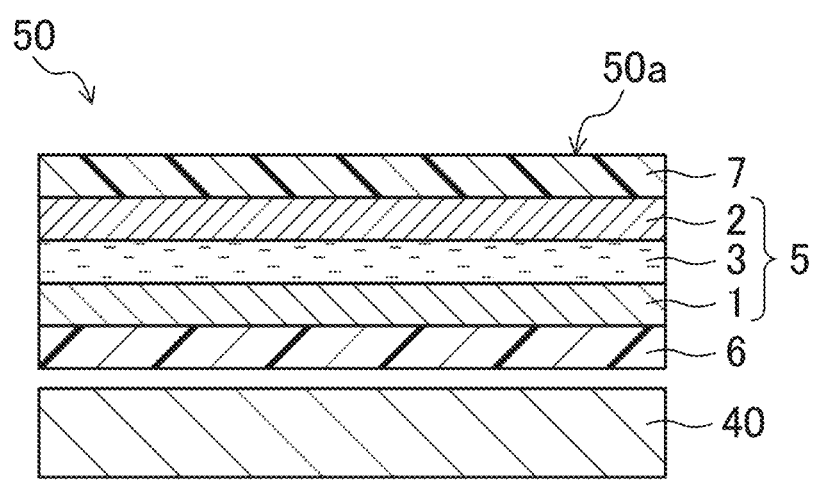
FIG. 1 is a cross-sectional view of a liquid crystal display device including a backlight unit of an embodiment.

As shown in FIG. 1, a liquid crystal display device 50 includes a liquid crystal display panel 5, a first polarizing plate 6 attached to a lower surface of the liquid crystal display panel 5, a second polarizing plate 7 attached to an upper surface of the liquid crystal display panel 5, and a backlight unit 40 provided on a back surface side of the liquid crystal display panel 5 with the first polarizing plate 6 sandwiched therebetween.

The liquid crystal display panel 5 includes a TFT substrate 1 and a CF substrate 2 provided so as to face each other, a liquid crystal layer 3 provided between the TFT substrate 1 and the CF substrate 2, and a sealing (not shown) provided in a frame shape to seal the liquid crystal layer 3 between the TFT substrate 1 and the CF substrate 2.

The shape of a display screen 50a of the liquid crystal display device 50 viewed from the front (the top in FIG. 1) is basically a rectangle or a square. Alternatively, the shape may be any shape such as a rectangle with rounded corners, an oval, a circle, a trapezoid, the shape of an instrument panel of an automobile, or the like.

The liquid crystal display device 50 applies a voltage of a predetermined magnitude to the liquid crystal layer 3 in sub-pixels corresponding to pixel electrodes, thereby changing the alignment state of the liquid crystal layer 3. This adjusts the transmittance of light incident from the backlight unit 40 through the first polarizing plate 6. The light whose transmittance is adjusted is emitted through the second polarizing plate 7 to display an image.

The liquid crystal display device 50 of this embodiment is used as a display apparatus built in various information apparatuses (e.g., in-vehicle devices such as car navigation systems; personal computers; mobile phones; portable information equipment such as laptops and tablet computers;

portable game machines; copying machines; ticket vending machine; automated teller machines; and the like).

The TFT substrate 1 includes, e.g., a plurality of TFTs arranged in a matrix on a glass substrate, an interlayer insulating film arranged in such a manner as to cover the TFTs, a plurality of pixel electrodes arranged in a matrix on the interlayer insulating film and connected to the TFTs, respectively, and an alignment film arranged in such a manner as to cover the pixel electrodes. The CF substrate 2 includes, e.g., a black matrix arranged in a lattice manner on a glass substrate, a color filter including a red layer, a green layer, and a blue layer arranged between lattices of the black matrix, a common electrode arranged in such a manner as to cover the black matrix and the color filter, and an alignment film arranged in such a manner as to cover the common electrode. The liquid crystal layer 3 is made of, e.g., a nematic liquid crystal material containing liquid crystal molecules having electro-optical characteristics. The first polarizing plate 6 and the second polarizing plate 7 each includes, e.g., a polarizer layer having a polarization axis in one direction, and a pair of protective layers arranged in such a manner as to sandwich the polarizer layer.

Configurations of Backlight Unit and Optical Sheet Laminate

Figure 2:
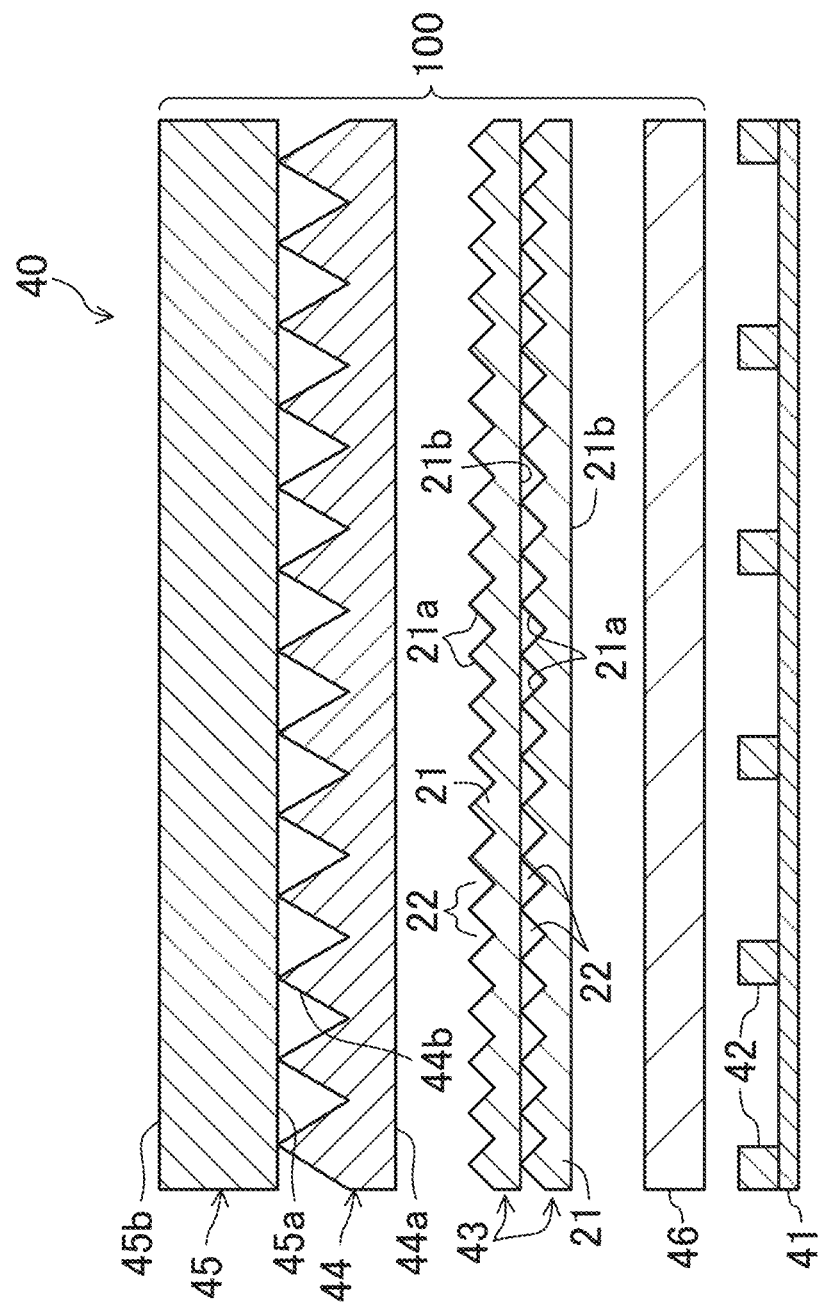
FIG. 2 is a cross-sectional view of a backlight unit containing an optical sheet laminate of the embodiment.

As shown in FIG. 2, the backlight unit 40 includes a reflection sheet 41, a plurality of light sources 42 two-dimensionally arranged on the reflection sheet 41, and an optical sheet laminate 100 provided above the plurality of light sources 42. The optical sheet laminate 100 includes a diffusion sheet 43 arranged above the light sources 42, and a pair of prism sheets 44 and 45 provided above the diffusion sheet 43 (i.e., provided closer to the display screen 50a). The optical sheet laminate 100 includes a color conversion sheet 46 between the light sources 42 and the diffusion sheet 43. Each sheet constituting the optical sheet laminate 100 may be in the form of a film or a plate.

In this embodiment, the diffusion sheet 43 includes, e.g., two diffusion sheets each having the same structure and layered in the backlight unit 40. The diffusion sheet 43 may include one diffusion sheet, or three or more diffusion sheets in layers. In particular, the diffusion sheet 43 may include one diffusion sheet when the luminance uniformity can be sufficiently increased by precise arrangement of the light sources 42 or the like in the backlight unit 40. The pair of prism sheets 44 and 45 may be a lower prism sheet 44 and an upper prism sheet 45 having prism extending directions (directions in which prism ridges extend) perpendicular to each other. The color conversion sheet 46 may be arranged between the diffusion sheet 43 and the pair of prism sheets 44 and 45.

[Reflection Sheet]

The reflection sheet 41 is formed of, e.g., a white polyethylene terephthalate resin film, a silver-deposited film, or the like.

[Light Source]

The light sources 42 may be, e.g., blue light sources that emit light of $x<0.24$ and $y<0.18$ in the CIE1931 color coordinates. The type of the light sources 42 is not particularly limited. For example, an LED element, a laser element, or the like may be adopted, and an LED element may be adopted for the sake of costs, productivity, and the like. To adjust a light emission angle of each LED element, a lens may be attached to the LED element. When the light sources 42 are configured by LED elements, the LED elements (chips) may have a rectangular shape in a plan view, where each side may be 50 µm or more (preferably 100 µm or more) and 1 mm or less. The LED chips may be arranged two-dimensionally on the reflection sheet 41 at regular intervals. When the plurality of LED chips are arranged at equal intervals, the distance between the centers of two chips adjacent to each other may be 0.5 mm or more (preferably 2 mm or more) and 20 mm or less.

The light sources 42 may be white light sources instead of blue light sources. The white light sources may be configured by an LED element having the peak wavelength in a blue region, an LED element having the peak wavelength in a green region, and an LED element having the peak wavelength in a red region, and may emit light of $0.24<x<0.42$ and $0.18<y<0.48$ in the CIE1931 color coordinates. When the white light sources are used, the color conversion sheet 46 may be unnecessary.

Diffusion Sheet

Figure 3:
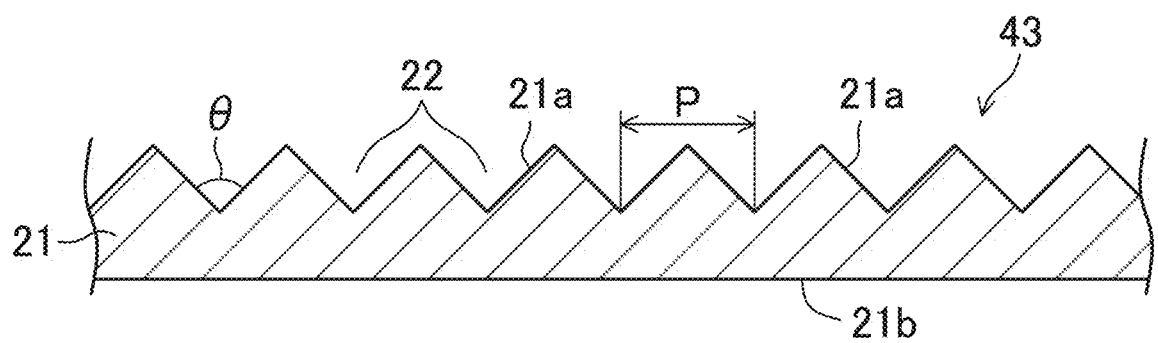
FIG. 3 is a cross-sectional view of a diffusion sheet in the optical sheet laminate of the embodiment.

The diffusion sheet 43 includes a base material layer 21 as shown in FIG. 2 and FIG. 3. The diffusion sheet 43 (base material layer 21) includes a first surface 21a as a light emitting surface and a second surface 21b as a light incident surface. That is, the diffusion sheet 43 is arranged so that the second surface 21b faces the light sources 42. A resin for a matrix of the base material layer 21 is not particularly limited as long as it is formed of a material that transmits light, and may be, e.g., acrylic, polystyrene, polycarbonate, methyl methacrylate/styrene copolymer (MS) resin, polyethylene terephthalate, polyethylene naphthalate, cellulose acetate, polyimide, or the like. The base material layer 21 may contain a diffusing agent or other additives, or may be substantially free of additives. The additives that the base material layer 21 can contain are not particularly limited, but examples of the additives include silica, titanium oxide, aluminum hydroxide, and barium sulfate as inorganic particles, as well as acrylic, acrylonitrile, silicone, polystyrene, and polyamide as organic particles.

The thickness of the light diffusion sheet 43 is not limited, but may be, e.g., 0.1 mm or more and 3 mm or less (preferably 2 mm or less, more preferably 1.5 mm or less, and further more preferably 1 mm or less). The diffusion sheet 43 having a thickness of greater than 3 mm makes it difficult to reduce the thickness of the liquid crystal display. The diffusion sheet 43 having a thickness of less than 0.1 mm makes it difficult to achieve the luminance uniformity. The diffusion sheet 43 may be in the form of a film or a plate.

Figure 4:
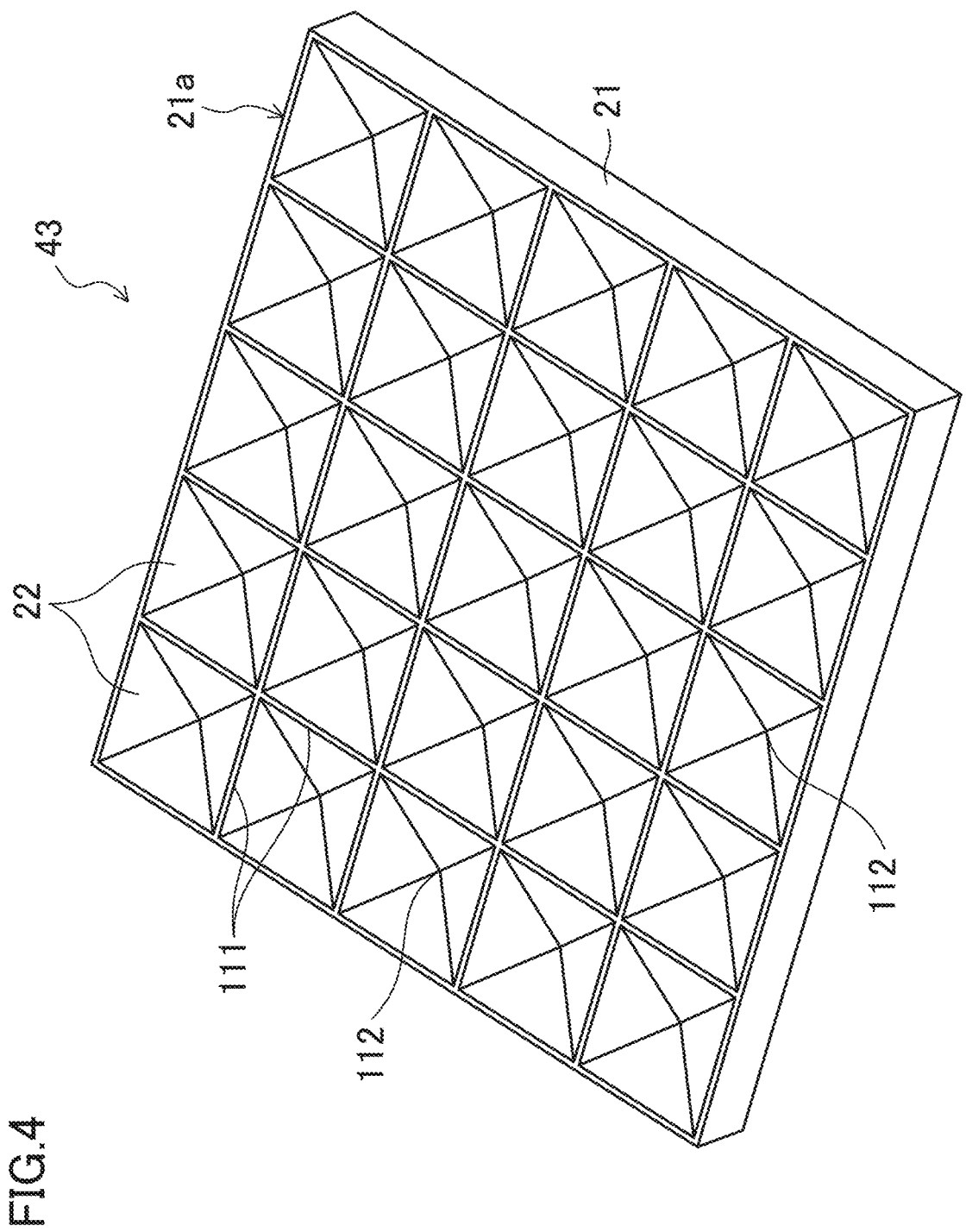
FIG. 4 is a perspective view of a diffusion sheet in the optical sheet laminate of the embodiment.

On the first surface 21a of the light diffusion sheet 43, a plurality of recesses 22 having a substantially inverted quadrangular pyramid shape (inverted pyramid shape) are arranged in a two-dimensional matrix as shown in FIG. 4. In other words, the plurality of recesses 22 are arranged along two directions perpendicular to each other. The recesses 22 adjacent to each other are parted by a ridge 111. The ridge 111 extends along the two directions in which the recesses 22 are arrayed. A center (apex of the inverted pyramid) 112 of the recess 22 is a deepest portion of the recess 22. Although FIG. 4 illustrates that the recesses 22 are arranged in a 5×5 matrix for simplicity, the actual number of the recesses 22 is much larger. In a two-dimensional array of the plurality of recesses 22, the recesses 22 may be arranged on the first surface 21a without a space therebetween, or may be arranged with a predetermined space therebetween. Some of the recesses 22 may be randomly arranged to the extent that the light diffusing effect is not lost.

The apex angle θ of the recess 22 may be, e.g., 90°. The recesses 22 may be arranged at an arrangement pitch p of, e.g., 100 μm. The depth of the recess 22 may be, e.g., 50 μm. The apex angle θ of the recess 22 is an angle formed by cross-sectional lines of a pair of inclined surfaces of the recess 22 which sandwich the center of the recess 22 and face each other, where the cross-sectional lines appear in a cross section when the recess 22 is cut by a surface (longitudinal cross-section) vertical to a surface (horizontal surface) on which the light diffusion sheet 43 is placed, such that the surface (longitudinal cross-section) passes through the center of the recess 22 (apex 112 of the inverted pyramid) and vertically traverses the pair of inclined surfaces of the recess 22. The arrangement pitch p of the recesses 22 means a distance between the centers of the recesses 22 (apexes of the inverted pyramids 112) adjacent to each other (i.e., distance in a direction parallel to the arrangement surface of the diffusion sheet 43).

The second surface 21b of the diffusion sheet 43 may be, e.g., a flat surface (mirror surface) or an embossed surface. The diffusion sheet 43 may have a single layer structure consisting of the base material layer 21 with the first surface 21a having an uneven shape (recesses 22). The diffusion sheet 43 may have a double layer structure consisting of a base material layer having two flat surfaces and a layer having one uneven surface. The diffusion sheet 43 may have a triple or more layer structure including a layer having one uneven surface.

Method for Manufacturing Diffusion Sheet

The method for manufacturing the diffusion sheet 43 is not particularly limited. For example, extrusion molding, injection molding, or the like may be employed.

A single layer diffusion sheet having an uneven surface may be manufactured by extrusion molding as follows. First, plastic particles as pellets with a diffusing agent (and maybe plastic particles as pellets without a diffusing agent together) are introduced into a single-screw extruder. Then, the plastic particles are heated, molten, and kneaded. After that, the molten resin extruded from a T-die is sandwiched and cooled between two metal rolls, then transported by guide rolls, and cut off into sheet plates by a sheet cutter machine to produce diffusion sheets. Here, the molten resin is sandwiched using the metal roll having a surface with an inverted shape of desired unevenness, which will be transferred onto the resin. This allows for shaping of diffusion sheets having surfaces with the desired unevenness. The surface shapes of the rolls are not perfectly transferred onto the resin, and thus may be designed in consideration of how completely the shapes are transferred.

If a two-layered diffusion sheet with uneven surfaces is manufactured by extrusion molding, for example, plastic particles as pellets necessary for forming each layer may be introduced into each of two single-screw extruders. Then, the same procedure may be performed for each layer, and the fabricated sheets may be layered.

Alternatively, the two-layered diffusion sheet with an uneven surface may be manufactured as follows. First, plastic particles as pellets necessary for forming each layer are introduced into each of two single-screw extruders, molten by heating, and kneaded. Then, molten resin formed into each layer is introduced into a single T-die so that molten resins are layered in the T-die. Then, the layered molten resins extruded from the T-die are sandwiched and cooled between two metal rolls. After that, the layered molten resins are transported by guide rolls, and cut off into sheet plates using a sheet cutter machine, thus yielding a two-layered diffusion sheet with an uneven surface.

Alternatively, the diffusion sheet may be manufactured by shape-transfer using ultraviolet (UV) as follows. First, an uncured ultraviolet curable resin is filled in a roll having an inverted shape of an uneven shape to be transferred, and a base material is pressed onto the resin. Next, with the roll filled with ultraviolet curable resin and the base material in one piece, the resin is cured by UV irradiation. Next, the sheet to which the uneven shape has been transferred by using the resin is released from the roll. Finally, the sheet is irradiated with ultraviolet rays again to completely cure the resin, thereby producing a diffusion sheet having an uneven surface.

In the present disclosure, the term "substantially inverted quadrangular pyramid" is used in consideration of difficulty in formation of a recess having a geometrically exact inverted quadrangular pyramid shape by an ordinary shape transfer technique. However, the "substantially inverted quadrangular pyramid" encompasses shapes that can be regarded as a true or approximately inverted quadrangular pyramid. Further, "substantial(ly)" XX means that shapes can be approximated to the XX, and "substantially inverted quadrangular pyramids" means shapes that can be approximated to the inverted quadrangular pyramids. For example, the "substantially inverted quadrangular pyramid" includes an "inverted truncated quadrangular pyramid" which has a flat apex and of which the area of the apex is so small that the advantages of the present invention are not lost. The "substantially inverted quadrangular pyramid" also includes a deformation of "inverted quadrangular pyramid" with unavoidable shape variations due to the processing accuracy of industrial production.

Prism Sheet

The prism sheets 44 and 45, through which the light rays need to pass, are formed mainly of a transparent (e.g., colorless and transparent) synthetic resin. The prism sheets 44 and 45 may be formed as one piece. As shown in FIG. 2, the lower prism sheet 44 includes a base material layer 44a and an array of a plurality of prism projections 44b stacked on the surface of the base material layer 44a. Similarly, the upper prism sheet 45 includes a base material layer 45a and an array of a plurality of prism projections 45b stacked on the surface of the base material layer 45a. The prism projections 44b and 45b are stacked in a stripe pattern on the surfaces of the base material layers 44a and 45a, respectively. The prism projections 44b and 45b are triangular prisms and have back surfaces that are in contact with the surfaces of the base material layers 44a and 45a, respectively. The extending direction of the prism projections 44b and the extending direction of the prism projections 45b are perpendicular to each other. Accordingly, light rays incident from the diffusion sheet 43 can be refracted in the normal direction by the lower prism sheet 44, and light rays emitted from the lower prism sheet 44 can be further refracted by the upper prism sheet 45 in a direction substantially perpendicular to the display screen 50a.

The lower limit of the thickness of the prism sheets 44 and 45 (the height from the back surface of the base material layer 44a and 45a to the apex of the prism projections 44b and 45b) may be, e.g., approximately 50 μm, and more preferably approximately 100 μm. The upper limit of the thickness of the prism sheets 44 and 45 may be, e.g., approximately 200 μm, and more preferably approximately 180 μm. The lower limit of the pitch of the prism projections 44b and 45b in the prism sheets 44 and 45 may be, e.g., approximately 20 μm, and more preferably approximately 25 µm. The upper limit of the pitch of the prism projections 44b and 45b in the prism sheets 44 and 45 may be, e.g., approximately 100 µm, and more preferably approximately 60 µm. The apex angle of the prism projections 44b and 45b may be, e.g., 85° or more and 95° or less. The lower limit of the refractive index of the prism projections 44b and 45b may be, e.g., 1.5, and more preferably 1.55. The upper limit of the refractive index of the prism projections 44b and 45b may be, e.g., 1.7.

The prism sheets 44 and 45 may include the base material layers 44a and 45a and the prism projections 44b and 45b, where the prism projections 44b and 45b to which the shape transfer is applied by using an UV curable acryl-based resin are provided on the base material layers 44a and 45a made of, e.g., a PET (polyethylene terephthalate) film, or where the prism projections 44b and 45b are formed as a one piece with the base material layers 44a and 45a, respectively.

Color Conversion Sheet

The color conversion sheet 46 is a wavelength conversion sheet for converting light emitted from the light source 42 into light having a wavelength of a certain color (e.g., green or red) as a peak wavelength. For example, when the light sources 42 are blue light sources, the color conversion sheet 46 converts blue light with a wavelength of 450 nm into green light with a wavelength of 540 nm and red light with a wavelength of 650 nm. In this case, when the light source 42 emitting blue light with a wavelength of 450 nm is used, the color conversion sheet 46 partially converts blue light into green and red light, and thus the light transmitted through the color conversion sheet 46 becomes white light. The color conversion sheet 46 may be, e.g., a QD (quantum dot) sheet, a fluorescent sheet, or the like. When the light sources 42 are white light sources, the color conversion sheet 46 may be unnecessary.

Other Optical Sheets

Although not shown, a polarizing sheet may be provided above the prism sheets 44 and 45 (i.e., on the side closer to the display screen 50a). The polarizing sheet improves the luminance of the display screen 50a by keeping light emitted from the backlight unit 40 from being absorbed into the first polarizing plate 6 of the liquid crystal display device 50.

Features of Embodiment

Figure 5:
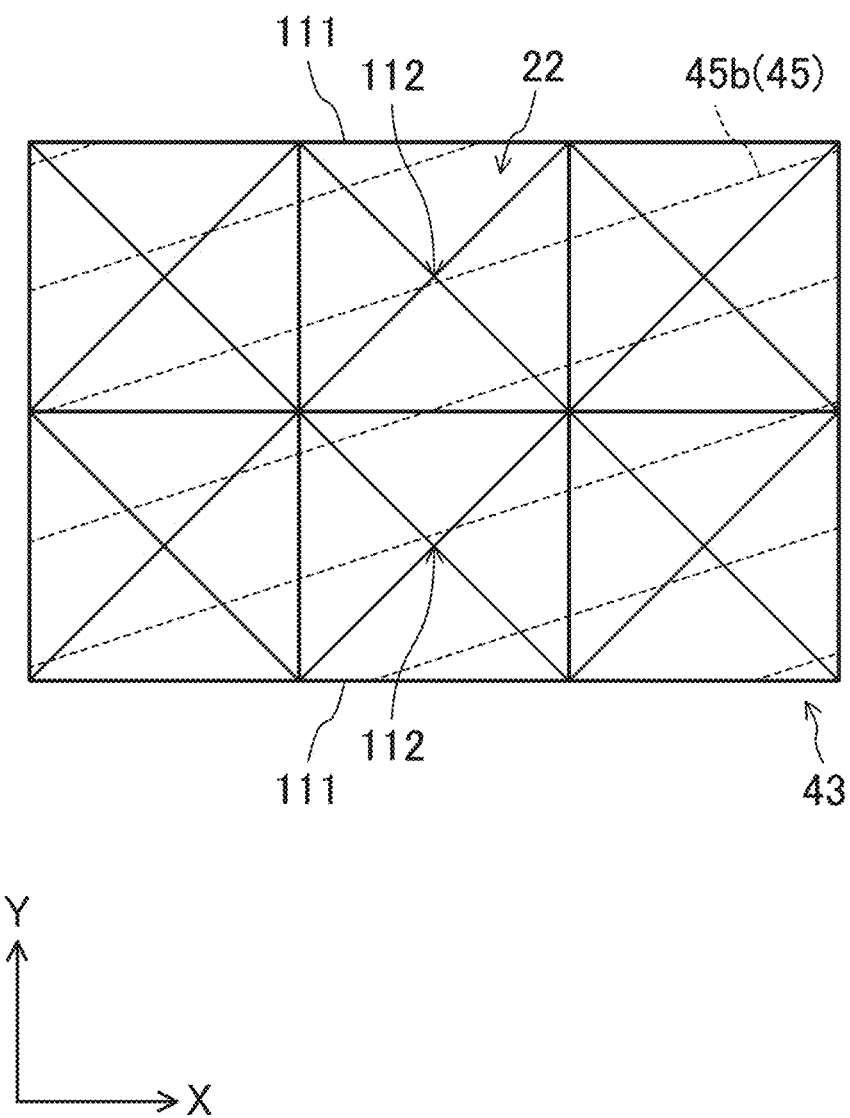
FIG. 5 is a view showing an exemplary relationship between an arrangement direction of recesses on the diffusion sheet and a prism extending direction of a prism sheet in the optical sheet laminate of the embodiment.

The optical sheet laminate 100 of this embodiment is incorporated into the backlight unit 40. The optical sheet laminate 100 includes the plurality of diffusion sheets 43 each having the first surface 21a provided with the plurality of recesses 22 having a substantially inverted quadrangular pyramid shape and arranged in a two-dimensional matrix, and the pair of prism sheets 44 and 45 having the prism projections 44b and 45b having the extending directions (hereinafter referred to as prism extending directions in some cases) perpendicular to each other. In the optical sheet laminate 100, the arrangement directions of the recesses 22 of one of the plurality of diffusion sheets 43 closest to the pair of prism sheets 44 and 45 intersect with the prism extending direction at an angle of 0° or more and 20° or less, or 70° or more and 90° or less, as shown in FIG. 5, for example. For the sake of simplicity, FIG. 5 omits illustration of the prism projections 44b. However, the extending direction of the prism projections 44b and the extending direction of the prism projections 45b are perpendicular to each other. Thus, when the extending direction of the prism projections 45b is in the above range of the intersecting angle, the extending direction of the prism projections 44b is also in the above range of the intersecting angle.

The optical sheet laminate 100 of this embodiment includes the plurality of diffusion sheets 43 in layer (hereinafter referred to as pyramid sheets in some cases), where each diffusion sheet 43 has surfaces, one of which has the plurality of recesses 22 having a substantially inverted quadrangular pyramid shape. Thus, the luminance uniformity of the backlight unit 40 can be improved. Further, the arrangement directions of the recesses of one of the plurality of diffusion sheets 43 closest to the pair of prism sheets 44 and 45 intersect with the prism extending direction at an angle of 0° or more and 20° or less, or 70° or more and 90° or less. Thus, with the same light source, the same electric power, and the same optical sheet laminate configuration, the luminance uniformity of the backlight unit 40 is more improved than with intersection at another range of angles.

In the optical sheet laminate 100 of this embodiment, the arrangement direction of the recesses 22 of one of the diffusion sheets 43 closest to the prism sheets 44 and 45 and the arrangement directions of the recesses 22 of the rest of the diffusion sheets 43 may be substantially the same as or may be different from each other depending on the conditions such as the arrangement of the light sources 42, the positional relationship among the optical sheets of the optical sheet laminate 100, and the like. Thus, the luminance uniformity of the backlight unit 40 can be further improved according to the conditions such as the arrangement of the light sources 42, the positional relationship among the optical sheets of the optical sheet laminate 100, and the like. The expression "the directions are substantially the same as each other" means that the angle difference between the two directions is 5° or less, preferably 3° or less, and more preferably 1° or less, and the expression "the directions are different from each other" means that the angle difference between the two directions is greater than 5°, and preferably 10° or more.

The backlight unit 40 of this embodiment is built in the liquid crystal display device 50 and leads light emitted from the light sources 42 toward the display screen 50a. The backlight unit 40 has the optical sheet laminate 100 of this embodiment between the display screen 50a and the light sources 42, and the plurality of diffusion sheets 43 are arranged between the light sources 42 and the prism sheets 44 and 45.

The backlight unit 40 of this embodiment includes the optical sheet laminate 100 of this embodiment, and thus the luminance uniformity can be improved.

In the backlight unit 40 of this embodiment, the light sources 42 may be arranged on the reflection sheet 41 provided on an opposite side of the display screen 50a when viewed from the plurality of diffusion sheets 43. This causes multiple reflections between the diffusion sheets 43 and the reflection sheet 41 thus causing further light diffusion, and thus the luminance uniformity is improved.

The backlight unit 40 of this embodiment can be downsized when the distance between the light sources 42 and the plurality of diffusion sheets 43 (to be precise, the distance between the light sources 42 and one of the diffusion sheets 43 closest to the light sources 42) is 5 mm or less. In anticipation of the future reduction in thicknesses of medium-to-small-sized liquid crystal displays, the distance between the light sources 42 and the diffusion sheet 43 may be preferably 2.5 mm or less, more preferably 1 mm or less, and ultimately 0 mm.

The liquid crystal display device 50 of this embodiment includes the backlight unit 40 of this embodiment and the liquid crystal display panel 5. Therefore, the luminance uniformity can be improved by the optical sheet laminate 100 incorporated in the backlight unit 40. Information apparatuses (e.g., portable information equipment such as laptop computers, tablet computers, and the like) containing the liquid crystal display device 50 can also achieve the similar advantages.

A method of this embodiment for manufacturing a backlight unit 40 is a method for manufacturing a backlight unit 40 to be built in a liquid crystal display device 50 and leading light emitted from light sources 42 toward a display screen 50a. The method of this embodiment for manufacturing a backlight unit 40 includes arranging a plurality of diffusion sheets 43 between the light sources 42 and a display screen 50a, where the diffusion sheet includes a first surface 21a having a plurality of recesses 22 having a substantially inverted quadrangular pyramid shape and arranged in a two-dimensional matrix; and arranging a pair of prism sheets 44 and 45 between the display screen 50a and the plurality of diffusion sheets 43, where the pair of prism sheets 44 and 45 have prism extending directions perpendicular to each other. In arranging the plurality of diffusion sheets 43, the luminance uniformity is evaluated with various intersecting angles between the arrangement direction of the recesses 22 of each diffusion sheet 43 and the prism extending direction. Then, based on the evaluation result, the arrangement direction of the recesses 22 of each diffusion sheet 43 is determined.

The method of this embodiment for manufacturing a backlight unit 40 includes arranging the plurality of diffusion sheets 43, where the arrangement direction of the recesses 22 of each diffusion sheet 43 is determined based on the result obtained by evaluation of the luminance uniformity with various intersecting angles between the arrangement direction of the recesses 22 of each diffusion sheet 43 and the prism extending direction. Therefore, the arrangement direction of the recesses 22 of each diffusion sheet 43 can be set to improve the luminance uniformity.

EXAMPLES

Example 1

Example 1 (actual measurement of luminance uniformity) will be described below.

Example 1 employed an optical sheet laminate 100 which included two diffusion sheets 43 having a thickness of 130 µm, having the same structure, and layered in the same orientation; and a lower prism sheet 44 and an upper prism sheet 45 having prism extending directions perpendicular to each other, where the lower prism sheet 44 and the upper prism sheet 45 were arranged above the diffusion sheets 43.

The diffusion sheets 43 each having recesses 22 having an inverted pyramid shape with an apex angle of 90° and a depth of 50 µm were formed, where the recesses 22 were arranged two-dimensionally at a pitch of 100 µm on a transparent polycarbonate sheet with a thickness of 80 µm by using an UV-curable resin having a refractive index of 1.587. The diffusion sheet 43 was arranged so that an arrangement surface (first surface 21a) provided with the recesses 22 served as a light emitting surface. The diffusion sheet 43 had a second surface 21b that was a flat surface (mirror surface).

The prism sheets 44 and 45 included base material layers 44a and 45a made of a PET film and prism projections 44b and 45b, where the prism projections 44b and 45b were provided on the base material layers 44a and 45a by using an UV-curable acryl-based resin made from acrylate. The lower prism sheet 44 had a total thickness of 145 µm, and had the prism projections 44b having a height of 12 µm and an apex angle of 94° and arranged at a pitch of 25 µm. The upper prism sheet 45 had a total thickness of 128 µm, and had the prism projections 45b having a height of 24 µm and an apex angle of 93° and arranged at a pitch of 51 µm.

As the light sources 42, an LED array including blue LEDs having a peak wavelength of 450 nm (full width at half maximum: 16 nm) and arranged two-dimensionally at a pitch of 2.8 mm was used. The light sources 42 were arranged below the optical sheet laminate 100 of this example (i.e., arranged closer to the diffusion sheet 43). The luminance uniformity of light having passed the optical sheet laminate 100 was evaluated with variation in the layout relationship between the diffusion sheet 43 and the prism sheets 44 and 45. The luminance uniformity with the blue light as it was from the light source 42 was evaluated without the color conversion sheet 46.

As shown in FIG. 6, in an initial state for the luminance uniformity evaluation, the diffusion sheet 43 was arranged so that one of the arrangement directions of the recesses 22 coincided with a reference direction (X-axis direction) (i.e., arrangement angle of 0°); the lower prism sheet 44 was arranged so that the extending direction of the prism projections 44b was rotated counterclockwise by 102° on the X-axis (i.e., arrangement angle of) 102°; and the upper prism sheet 45 was arranged so that the extending direction of the prism projections 45b was rotated counterclockwise by 12° on the X-axis (i.e., arrangement angle of) 12°. The LED array as the light sources 42 was arranged so that LEDs were arranged two-dimensionally along two directions including the X-axis direction and the direction perpendicular to the X-axis direction.

In a first evaluation, the arrangement directions (arrangement angle) of the two diffusion sheets 43 (pyramid sheets) were rotated counterclockwise together from the initial state by 10° each time and 180° in total in order to evaluate the luminance uniformity. In a second evaluation, the arrangement directions (arrangement angle) of two prism sheets 44 and 45 were rotated counterclockwise together from the initial state by 10° each time and 180° in total in order to evaluate the luminance uniformity.

The luminance uniformity evaluation was performed as follows. First, the optical sheet laminate 100 of this example was arranged above the light sources 42 (LED array), and a transparent glass plate was placed thereabove to reduce floating of the sheets. Then, the two-dimensional color luminance meter UA-200 manufactured by Topcon Technohouse Corporation was used to measure the luminance in a range of 33 mm square in the vertically upward direction (i.e., in the direction from the LED array towards the glass plate). Then, for two-dimensional luminance distribution images obtained, variation in the light emitting intensity of individual LEDs was corrected and filtering process was conducted to reduce bright/dark spot noise attributed to foreign materials and the like. Then, average and standard deviation were calculated for the luminance of all the pixels. Finally, the luminance uniformity was evaluated with the definition of "luminance uniformity=average/standard deviation".

Figure 7:
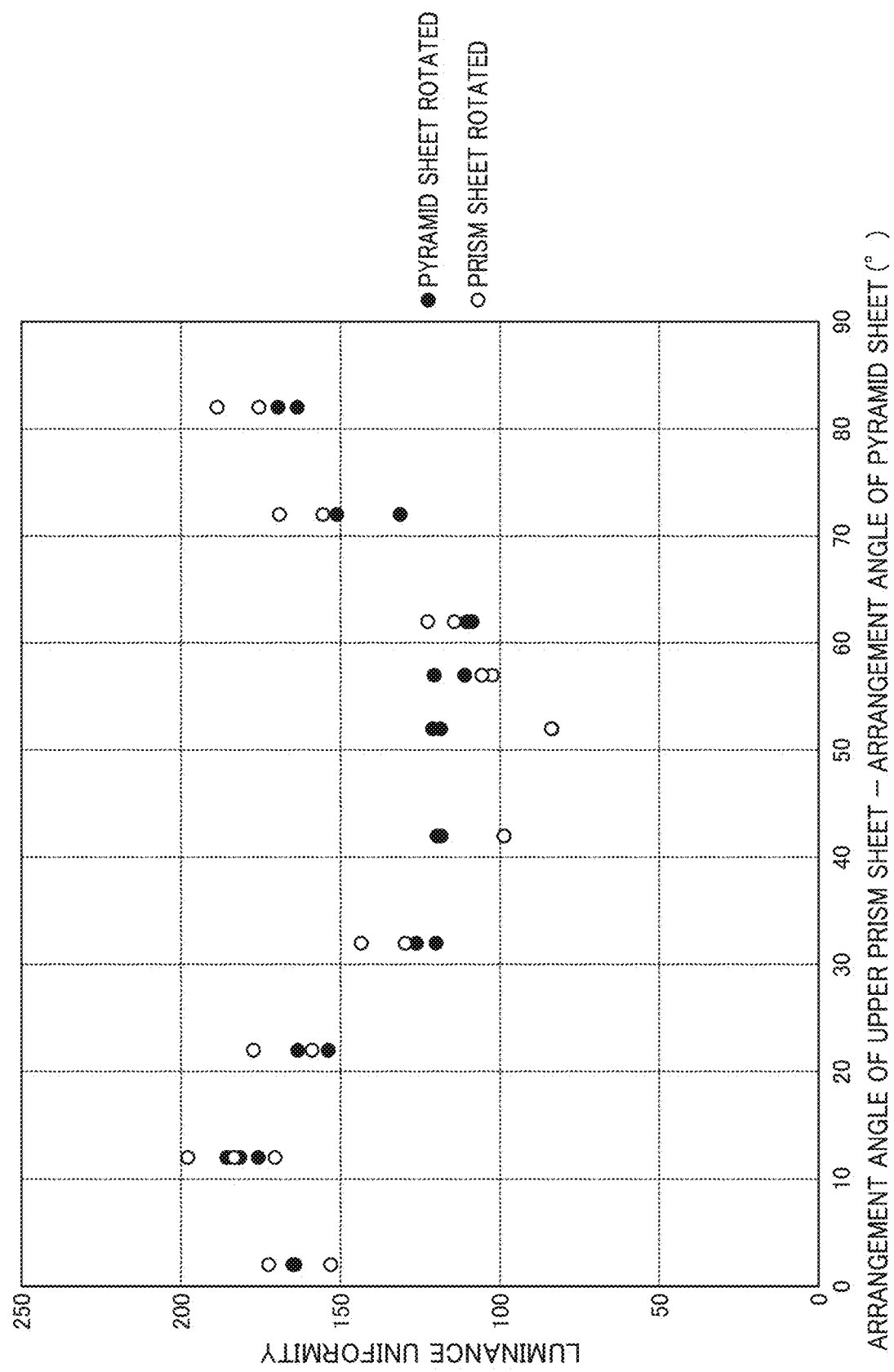
FIG. 7 is a diagram showing variation in the luminance uniformity in the optical sheet laminate of Example 1, with variation in the arrangement angle difference between the diffusion sheet (pyramid sheet) and the upper prism sheet.

FIG. 7 shows the variation in the luminance uniformity obtained in the first evaluation (black circles in the figure) and the variation in the luminance uniformity obtained in the second evaluation (white circles in the figure). In FIG. 7, the horizontal axis represents "the arrangement angle of the upper prism sheet 45" minus "the arrangement angle of the diffusion sheet (pyramid sheet) 43" (hereinafter simply referred to as "arrangement angle difference" in some cases), and the arrangement angle difference in the initial state is 12° (see FIG. 6).

In the first evaluation, the "arrangement angle difference" decreases by 10° each time as the diffusion sheet 43 rotates, and in the second evaluation, the arrangement angle difference increases by 10° each time as the upper prism sheet 45 rotates. However, since the diffusion sheet 43 has an equivalent shape at arrangement angles of 0° (180°) and (90°) (270°), the "arrangement angle difference" was converted as follows. When the "arrangement angle difference" was a negative value, a multiple of 90° was added to the "arrangement angle difference" to convert the value into 0° or more and 90° or less, and when the "arrangement angle difference" was greater than 90°, a multiple of 90° was subtracted from the "arrangement angle difference" to convert the value into 0° or more and 90° or less. Accordingly, there are a plurality of luminance uniformity values on the vertical axis for the same "arrangement angle difference" on the horizontal axis. The "arrangement angle difference" converted as described above is equal to the intersecting angle between the arrangement direction of the recesses 22 of the diffusion sheet 43 and the prism extending direction (the extending direction of the prism projections 44*b* and 45*b*) (hereinafter simply referred to as "intersecting angle" in some cases).

As shown in FIG. 7, the luminance uniformity more significantly increases when the "arrangement angle difference" ranges between 0° and 20° and between 70° and 90° (i.e., the "intersecting angle" ranges between 0° and 20° and between 70° and) 90° than the "arrangement angle difference" ranges between 20° and 70° (i.e., the "intersecting angle" ranges between 20° and) 70°. In particular, the luminance uniformity reaches a maximum value when the "arrangement angle difference" is near 10° or near 80° (i.e., the "intersecting angle" is near 10° or near 80°). Then, relatively high luminance uniformity is obtained within a ±5° range of the "arrangement angle difference" that yields the maximum value.

As described above, it has been found that the optical sheet laminate 100 of this example enables higher luminance uniformity when the "intersecting angle" ranges between 0° and 20° and between 70° and 90°, and enables significantly higher luminance uniformity when the "intersecting angle" ranges between approximately 5° and 15° or between approximately 75° and 85°, whether the arrangement angle of the diffusion sheet 43 or the arrangement angle of the prism sheets 44 and 45 is changed.

<Reference Example>

Figure 8:
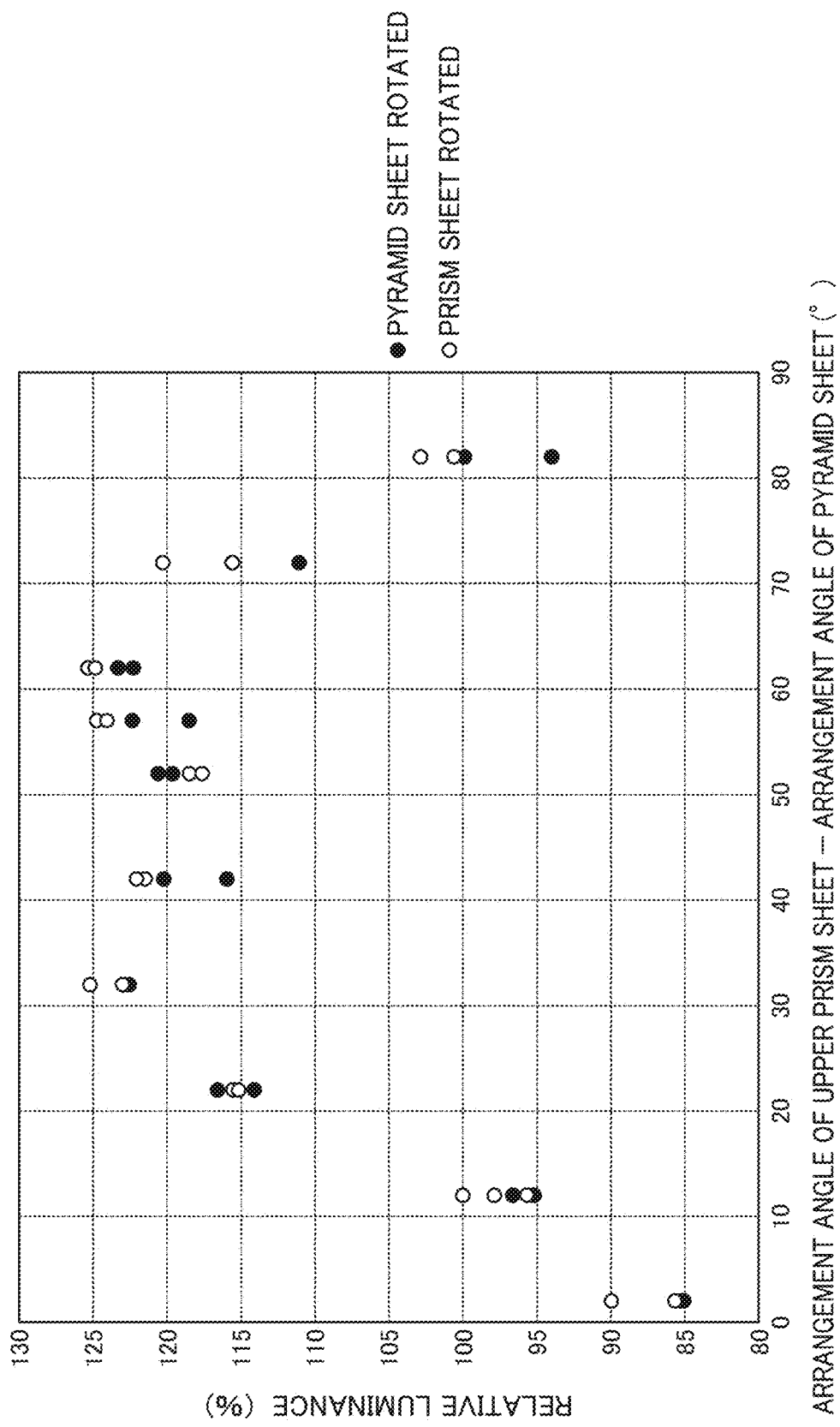
FIG. 8 is a diagram showing variation in the luminance in the optical sheet laminate of Reference Example, with variation in the arrangement angle difference between the diffusion sheet (pyramid sheet) and the upper prism sheet.

FIG. 8 shows the variation in the luminance (average) obtained in the first evaluation (black circles in the figure) and the variation in the luminance (average) obtained in the second evaluation (white circles in the figure). In FIG. 8, the horizontal axis represents "the arrangement angle of the upper prism sheet 45" minus "the arrangement angle of the diffusion sheet (pyramid sheet) 43", and the arrangement angle difference in the initial state is 12° (see FIG. 6). The method of converting the "arrangement angle difference" is the same as that in Example 1. In FIG. 8, the luminance on the vertical axis is represented by a relative luminance, where one of the measured luminance values in the initial state (when the "arrangement angle difference" is 12°) of the optical sheet laminate 100 is 100%.

As shown in FIG. 8, the luminance increases more significantly increases when the "arrangement angle difference" ranges between 20° and 70° (i.e., the "intersecting angle" ranges between 20°) and 70° than when the "arrangement angle difference" is near 0° or near 90° (i.e., the "intersecting angle" is near 0° or near 90°).

Thus, it is clear from the results shown in FIG. 7 and FIG. 8 that regarding the "arrangement angle difference", there is a trade-off relationship between the luminance and the luminance uniformity. Therefore, for a product in balance with both the luminance and the luminance uniformity, the "arrangement angle difference" may be set, e.g., between approximately 10° and 30° (preferably between approximately 15° and 25°) or between approximately 60° and 80° (preferably between approximately 65° and 75°).

Example 2

Example 2 (simulation of luminance uniformity) will be described below.

Example 2 employed an optical sheet laminate 100 which included three diffusion sheets 43 each having a thickness of 110 μm and having the same structure, and a lower prism sheet 44 and an upper prism sheet 45 having prism extending directions perpendicular to each other, where the lower prism sheet 44 and the upper prism sheet 45 were arranged above the diffusion sheets 43.

The diffusion sheet 43 had a first surface 21*a* (light emitting surface) on which recesses 22 each having an inverted pyramid shape with an apex angle of 90° and a depth of 50 μm were arranged two-dimensionally at a pitch of 100 μm. The diffusion sheet 43 had a second surface 21*b* that was a flat surface (mirror surface).

The lower prism sheet 44 and the upper prism sheet 45 had respective prism projections 44*b* and 45*b* having a height of 50 μm and an apex angle of 90° and arranged at a pitch of 100 μm. The prism sheets 44 and 45 each had a thickness of 130 μm. In the prism sheets 44 and 45, base material layers 44*a* and 45*a* and the prism projections 44*b* and 45*b* were configured as single layer products having the same optical characteristics, and their refractive indices and the absorbing characteristics were the same as those of polycarbonate.

As light sources 42, an LED array including a plurality of blue LEDs having a peak wavelength of 450 nm (full width at half maximum: 16 nm) and arranged two-dimensionally (specifically, 3×3 longitudinally and laterally) at a pitch of 2.8 mm was used. The light sources 42 were arranged below the optical sheet laminate 100 of this example (i.e., arranged closer to the diffusion sheet 43). The luminance uniformity of light having passed the optical sheet laminate 100 was evaluated by simulation with variation in the layout relationship between the diffusion sheet 43 and the prism sheets 44 and 45. The luminance uniformity with the blue light as it was from the light source 42 was evaluated without the color conversion sheet 46.

In the luminance uniformity evaluation, the lower prism sheet 44 was arranged so that the extending direction of the prism projections 44*b* was rotated counterclockwise by 102° on the X-axis (i.e., arrangement angle of) 102°; and the upper prism sheet 45 was arranged so that the extending direction of the prism projections 45*b* was rotated counterclockwise by 12° on the X-axis (i.e., arrangement angle of 12°) (see FIG. 6). The LED array as the light sources 42 was arranged so that LEDs were arranged two-dimensionally along two directions including the X-axis direction and the direction perpendicular to the X-axis direction. The three diffusion sheets 43 were arranged so that the arrangement directions of the recesses 22 were angled at 0°, 12°, 30°, 45°, and 60° (hereinafter referred to as arrangement angles) with respect to the LED arrangement direction as a reference.

The luminance uniformity evaluation was performed as follows. First, 107 light rays in total were emitted from the light sources 42 of a 3×3 LED array. A virtual sensor having a size of 8.4 mm×8.4 mm was arranged directly above the upper prism sheet 45 with 42×42 meshes, each of which was 0.2 mm square, sandwiched between the upper prism sheet 45 and the virtual sensor, and the surface luminance distribution was derived from the intensity, the number, and the light emission angle of light rays passing through the meshes. The surface luminance distribution contains noise. To reduce this noise, the obtained surface luminance distribution was equally divided into 3×3 distributions, and these nine divided distributions were used to create a single average distribution. Then, the average and standard deviation of the luminance of the average distribution were calculated, and the luminance uniformity was evaluated with the definition of "luminance uniformity=average/standard deviation".

Table 1 shows the luminance uniformity evaluation results, where the arrangement angle of one (i.e., third sheet) of the diffusion sheets 43 closest to the upper prism sheet 45 was 0° (the arrangement angle difference with respect to the upper prism sheet 45 was 12° (=12°−0°)), and the arrangement angles of the rest (i.e., first and second sheets) of the diffusion sheets 43 were 0°, 12°, 30°, 45°, and 60°.

TABLE 1

| Third Sheet: 0° | | First Sheet | | | |
|---|---|---|---|---|---|
| | | 0° | 12° | 30° | 45° | 60° |
| Second Sheet | 0° | 11.6 | 12.2 | 11.5 | 11.9 | 11.2 |
| | 12° | 11.6 | 12.5 | 12.8 | 12.1 | 11.7 |
| | 30° | 10.8 | 12.2 | 12.5 | 12.5 | 11.6 |
| | 45° | 11.3 | 11.8 | 13.9 | 14.3 | 13.0 |
| | 60° | 11.9 | 12.3 | 12.6 | 13.0 | 12.9 |

Table 2 shows the luminance uniformity evaluation results, where the arrangement angle of one (i.e., third sheet) of the diffusion sheets 43 closest to the upper prism sheet 45 was 30° (the arrangement angle difference with respect to the upper prism sheet 45 was 72° (=(12°−30°)+90°)), and the arrangement angles of the rest (i.e., first and second sheets) of the diffusion sheets 43 were 0°, 12°, 30°, 45°, and 60°.

TABLE 2

| Third Sheet: 30° | | First Sheet | | | |
|---|---|---|---|---|---|
| | | 0° | 12° | 30° | 45° | 60° |
| Second Sheet | 0° | 12.0 | 11.9 | 10.7 | 11.5 | 11.5 |
| | 12° | 12.1 | 12.6 | 12.2 | 12.2 | 12.1 |
| | 30° | 12.4 | 12.5 | 13.4 | 12.4 | 12.6 |
| | 45° | 12.8 | 13.5 | 13.5 | 13.5 | 13.5 |
| | 60° | 12.6 | 12.0 | 13.1 | 13.1 | 13.7 |

As shown in Table 1, where the arrangement angle of the diffusion sheet 43 (third sheet) was 0° (the arrangement angle difference with respect to the upper prism sheet 45 was) 12°, the luminance uniformity significantly increased when the arrangement angle of the diffusion sheet 43 (first sheet) was 30° and the arrangement angle of the diffusion sheet 43 (second sheet) was 45° and when the arrangement angle of the diffusion sheet 43 (first sheet) was 45° and the arrangement angle of the diffusion sheet 43 (second sheet) was 45°.

As shown in Table 2, where the arrangement angle of the diffusion sheet 43 (third sheet) was 30° (the arrangement angle difference with respect to the upper prism sheet 45 was) 72°, the luminance uniformity significantly increased when the arrangement angle of the diffusion sheet 43 (first sheet) was 12° to 60° and the arrangement angle of the diffusion sheet 43 (second sheet) was 45°; when the arrangement angle of the diffusion sheet 43 (first sheet) was 30° and the arrangement angle of the diffusion sheet 43 (second sheet) was 30°; and when the arrangement angle of the diffusion sheet 43 (first sheet) was 60° and the arrangement angle of the diffusion sheet 43 (second sheet) was 60°.

From the above, it has been found that the optical sheet laminate 100 of this example enables further improvement in the luminance uniformity by adjusting the arrangement angle of each diffusion sheet 43 (i.e., the arrangement direction of the recesses 22), when the arrangement angle difference (intersecting angle) of the diffusion sheet 43 (third sheet) with respect to the upper prism sheet 45 ranges between 0° and 20° or between 70° and 90°.

Example 3

Example 3 (actual measurement of luminance uniformity) will be described below.

Example 3 employed an optical sheet laminate 100 which included three diffusion sheets 43 each having a thickness of 110 μm and having the same structure, and a lower prism sheet 44 and an upper prism sheet 45 having prism extending directions perpendicular to each other, where the lower prism sheet 44 and the upper prism sheet 45 were arranged above the diffusion sheets 43.

The diffusion sheets 43 each having recesses 22 having an inverted pyramid shape with an apex angle of 90° and a depth of 50 μm were formed, where the recesses 22 were arranged two-dimensionally at a pitch of 100 μm on a transparent polycarbonate sheet with a thickness of 60 μm by using an UV-curable resin having a refractive index of 1.587. The diffusion sheet 43 was arranged so that an arrangement surface (first surface 21a) provided with the recesses 22 served as a light emitting surface. The diffusion sheet 43 had a second surface 21b that was a mat surface.

The prism sheets 44 and 45 included base material layers 44a and 45a made of a PET film and prism projections 44b and 45b, where the prism projections 44b and 45b were provided on the base material layers 44a and 45a by using an UV-curable acryl-based resin made from acrylate. The lower prism sheet 44 had a total thickness of 145 μm, and had the prism projections 44b having a height of 12 μm and an apex angle of 94° and arranged at a pitch of 25 μm. The upper prism sheet 45 had a total thickness of 128 μm, and had the prism projections 45b having a height of 24 μm and an apex angle of 93° and arranged at a pitch of 51 μm.

As the light sources 42, an LED array including blue LEDs having a peak wavelength of 450 nm (full width at half maximum: 16 nm) and arranged two-dimensionally at a pitch of 2.8 mm was used. The light sources 42 were arranged below the optical sheet laminate 100 of this example (i.e., arranged closer to the diffusion sheet 43). The luminance uniformity of light having passed the optical sheet laminate 100 was evaluated with variation in the layout relationship between the diffusion sheet 43 and the prism sheets 44 and 45. The luminance uniformity with the blue light as it was from the light source 42 was evaluated without the color conversion sheet 46.

In the luminance uniformity evaluation, the lower prism sheet 44 was arranged so that the extending direction of the prism projections 44b was rotated counterclockwise by 102° on the X-axis (i.e., arrangement angle of 102°); and the upper prism sheet 45 was arranged so that the extending direction of the prism projections 45b was rotated counterclockwise by 12° on the X-axis (i.e., arrangement angle of) 12° (see FIG. 6). The LED array as the light sources 42 was arranged so that LEDs were arranged two-dimensionally along two directions including the X-axis direction and the direction perpendicular to the X-axis direction. The three diffusion sheets 43 were arranged so that the arrangement directions of the recesses 22 were angled of 0°, 30°, 45° and 60° (hereinafter referred to as arrangement angles) with respect to the LED arrangement direction as a reference.

The luminance uniformity evaluation was performed in the same procedure as that in Example 1.

Table 3 shows the luminance uniformity evaluation results, where the arrangement angle of one (i.e., third sheet) of the diffusion sheets 43 closest to the upper prism sheet 45 was 30° (the arrangement angle difference with respect to the upper prism sheet 45 was 72° (=(12°−30°)+90°)), and the arrangement angles of the rest (i.e., first and second sheets) of the diffusion sheets 43 were 0°, 30°, 45°, and 60°.

TABLE 3

|  |  | First Sheet | | | |
| --- | --- | --- | --- | --- | --- |
| Third Sheet: 30° | | 0° | 30° | 45° | 60° |
| Second Sheet | 0° | 194 | 209 | 202 | 203 |
|  | 30° | 211 | 233 | 228 | 224 |
|  | 45° | 210 | 228 | 232 | 223 |
|  | 60° | 209 | 218 | 210 | 219 |

As shown in Table 3, where the arrangement angle of the diffusion sheet 43 (third sheet) was 30° (the arrangement angle difference with respect to the upper prism sheet 45 was 72°), the luminance uniformity significantly increased when the arrangement angle of the diffusion sheet 43 (first sheet) was 30° to 60° and the arrangement angle of the diffusion sheet 43 (second sheet) was 30° to 45° and when the arrangement angle of the diffusion sheet 43 (first sheet) was 60° and the arrangement angle of the diffusion sheet 43 (second sheet) was 60°. This luminance uniformity has substantially the same tendency as that of Example 2 shown in Table 2 does.

From the above, it has been found that the optical sheet laminate 100 of this example enables further improvement in the luminance uniformity by adjusting the arrangement angle of each diffusion sheet 43 (i.e., the arrangement direction of the recesses 22), when the arrangement angle difference (intersecting angle) of the diffusion sheet 43 (third sheet) with respect to the upper prism sheet 45 ranges between 70° and 90°.

Example 4

Example 4 (actual measurement of luminance uniformity and luminance) will be described below.

Example 4 employed an optical sheet laminate 100 which included three diffusion sheets 43 each having a thickness of 110 μm and having the same structure; and a lower prism sheet 44 and an upper prism sheet 45 having prism extending directions perpendicular to each other, where the lower prism sheet 44 and the upper prism sheet 45 were arranged above the diffusion sheets 43.

As the light sources 42, an LED array including blue LEDs having a peak wavelength of 450 nm (full width at half maximum: 16 nm) and arranged two-dimensionally at a pitch of 2.8 mm was used.

The diffusion sheets 43 each had recesses 22 having an inverted pyramid shape with an apex angle of 90° and arranged two-dimensionally at a pitch of 100 μm. The diffusion sheet 43 was arranged so that an arrangement surface (first surface 21a) provided with the recesses 22 served as a light emitting surface. The diffusion sheet 43 had a second surface 21b that was a flat surface.

The prism sheets 44 and 45 included base material layers 44a and 45a made of a PET film and prism projections 44b and 45b, where the prism projections 44b and 45b were provided on the base material layers 44a and 45a by using an UV-curable acryl-based resin made from acrylate. The lower prism sheet 44 had a total thickness of 90 μm, and had the prism projections 44b having a height of 12 μm and an apex angle of 90° and arranged at a pitch of 24 μm. The upper prism sheet 45 had a total thickness of 155 μm, and had the prism projections 45b having a height of 25 μm and an apex angle of 90° and arranged at a pitch of 50 μm.

In this example, a color conversion sheet 46 made of a QD sheet was arranged below the diffusion sheets 43, and an upper light diffusion sheet was arranged above the upper prism sheet 45. The upper light diffusion sheet had a double-layered structure including a base material layer and a light diffusion layer. The base material layer was made of a transparent resin as a main component to transmit light rays. The light diffusion layer was formed by dispersion of resin beads in a resin matrix.

In this example, the variations in the luminance uniformity and luminance were evaluated, where the arrangement angles of the three diffusion sheets 43 (the intersecting angles between the arrangement direction of the recesses 22 and the arrangement direction of the light sources 42) were fixed to 45° and 0°, and the prism sheets 44 and 45 were rotated. The luminance uniformity evaluation was performed in the same procedure as that in Example 1, and the average of the luminance obtained in the same procedure as that in Example 1 was used as the luminance.

Figure 9:
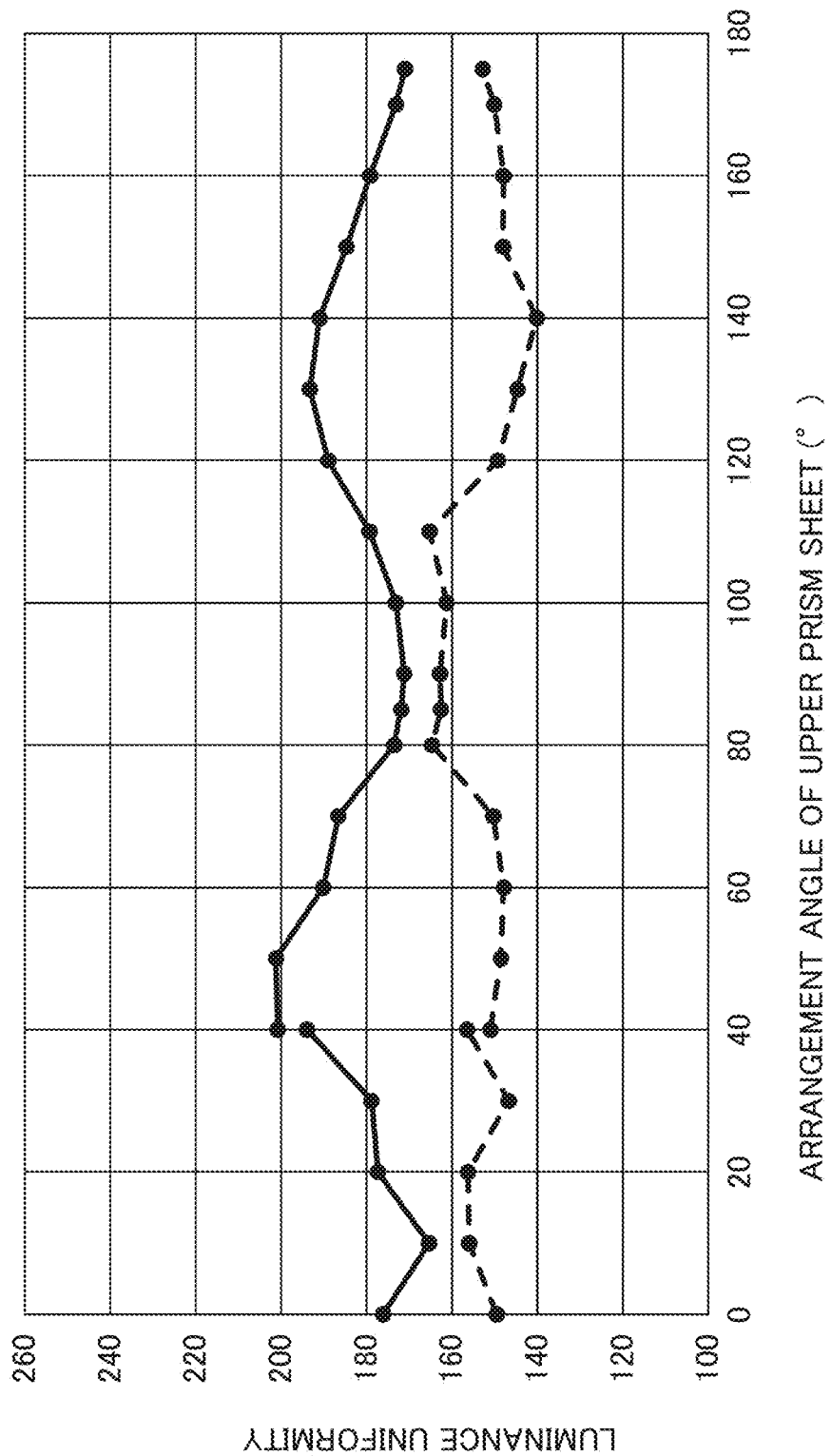
FIG. 9 is a diagram showing variation in the luminance uniformity in the optical sheet laminate of Example 4, with variation in the arrangement angle of the upper prism sheet.
Figure 10:
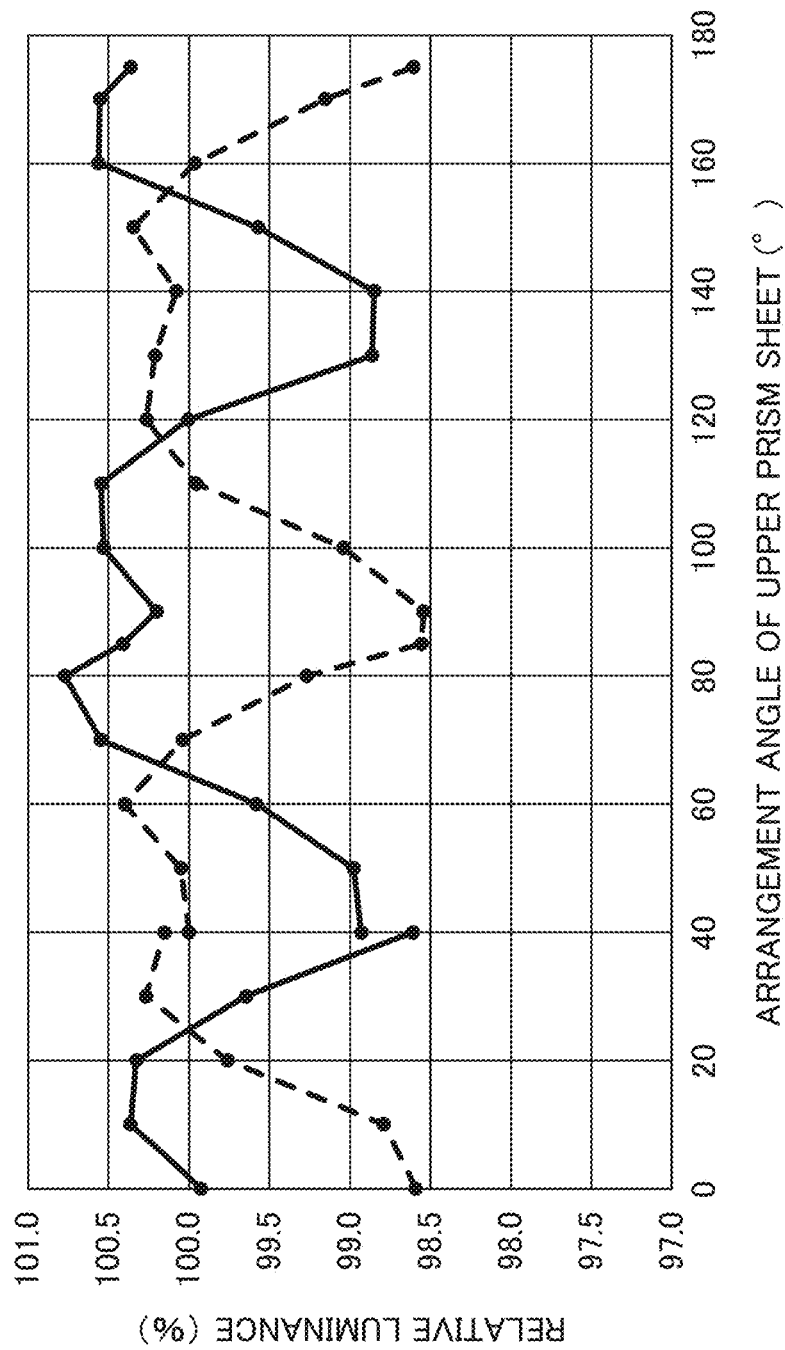
FIG. 10 is a diagram showing variation in the luminance in the optical sheet laminate of Example 4, with variation in the arrangement angle of the upper prism sheet.

FIG. 9 and FIG. 10 show the variations in the luminance uniformity and luminance obtained in this example, respectively. In FIG. 9 and FIG. 10, the solid line represents the result obtained when the arrangement angle of the diffusion sheets 43 was 45°, and the broken line represents the result obtained when the arrangement angle of the diffusion sheets 43 was 0°. The horizontal axis in FIG. 9 and FIG. 10 represents the arrangement angle of the upper prism sheet 45 (the rotation angle of the extending direction of the prism projections 45b (ridges) with respect to the arrangement direction (X direction) of the light sources 42), whereas the arrangement angle of the lower prism sheet 44 (the rotation angle of the extending direction of the prism projections 44b (ridges) with respect to the arrangement direction (X direction) of the light sources 42) is "the arrangement angle of the upper prism sheet 45"+90°.

As shown in FIG. 9, when the arrangement angle of the diffusion sheets 43 was 0°, the luminance uniformity was improved when the arrangement angle of the upper prism sheet 45 ranged between approximately 0° and 20°, between approximately 70° and 110°, and between approximately 160° and 180°. When the arrangement angle of the diffusion sheets 43 was 45°, the luminance uniformity was improved when the arrangement angle of the upper prism sheet 45 ranged between approximately 25° and 65° and between approximately 115° and 155°.

As described above, in this example, in both cases where the arrangement angle of the diffusion sheets 43 was 45° and 0°, the luminance uniformity was improved when the arrangement angle difference (="arrangement angle of upper prism sheet 45"–"arrangement angle of diffusion sheets 43") ranged between 0° and 20° and between 70° and 90° (i.e., when the intersecting angle ranged between 0° and 20° and between 70° and 90°).

In this example, as shown in FIG. 9, the luminance uniformity was higher when the arrangement angle of the diffusion sheets 43 was 45° than when the arrangement angle of the diffusion sheets 43 was 0°, at all arrangement angles of the prism sheets 44 and 45. Specifically, the average of the luminance uniformity was approximately 180 when the arrangement angle of the diffusion sheets 43 was 45°, whereas the average of the luminance uniformity was approximately 150 when the arrangement angle of the diffusion sheets 43 was 0°. When the arrangement angle of the diffusion sheets 43 was 45°, the luminance uniformity was improved by approximately three times the variation range dependent on the arrangement angles of the prism sheets 44 and 45, compared with the arrangement angle of the diffusion sheets 43 being 0°.

In this example, as shown in FIG. 10, in both cases where the arrangement angle of the diffusion sheets 43 was 45° and 0°, no significant decrease in the luminance due to the arrangement angles of the prism sheets 44 and 45 was observed. In FIG. 10, the luminance on the vertical axis is shown as relative luminance where one of the measured luminance values obtained when the arrangement angle of the diffusion sheets 43 is 0° is regarded as 100%. The "significant luminance decrease" means "a luminance decrease of greater than 2%".

Other Embodiments

In the above embodiment (including the example: the same applies to the description below), the optical sheet laminate 100 includes the diffusion sheets 43, the prism sheets 44 and 45, and the color conversion sheet 46. Alternatively, the optical sheet laminate 100 may include other optical sheets than the diffusion sheets 43, the prism sheets 44 and 45, and the color conversion sheet 46.

In the above embodiment, the inverted polygonal pyramid shape of the recesses 22 on the first surface 21a of the diffusion sheet 43 in the optical sheet laminate 100 is an inverted quadrangular pyramid. Alternatively, the inverted polygonal pyramid shape may be other shapes that can be arranged two-dimensionally, such as an inverted triangular shape or an inverted hexagonal shape. Alternatively, an array of projections such as prism projections and the like may be provided in place of the recesses 22 that can be arranged two-dimensionally. The second surface 21b of the diffusion sheet 43 is a flat surface (mirror surface) or an embossed surface. Alternatively, the second surface 21b of the diffusion sheet 43 may be provided with recesses having an inverted polygonal pyramid shape and capable of being arranged two-dimensionally, or an array of projections such as prism projections.

The above describes embodiments of the present disclosure. However, the present disclosure is not limited only to the aforementioned embodiments, and various modifications are possible within the scope of the disclosure. That is, the above description of the embodiments is solely to serve as an example in nature, and is not intended to limit the present disclosure, applications thereof, or uses thereof.

The invention claimed is:

1. A backlight unit to be built in a liquid crystal display device and leading light emitted from light sources toward a display screen, comprising:
   an optical sheet laminate between the display screen and the light sources,
   the optical sheet laminate comprising:
   a plurality of diffusion sheets each comprising surfaces, at least one of which has a plurality of recesses comprising a substantially inverted polygonal pyramid shape and arranged in a two-dimensional matrix; and
   a pair of prism sheets comprising prism extending directions perpendicular to each other, wherein
   the plurality of diffusion sheets are arranged between the light sources and the pair of prism sheets,
   a distance between the light sources and the plurality of diffusion sheets is 5 mm or less, and
   a first arrangement direction of the plurality of recesses of a first diffusion sheet that is one of the plurality of diffusion sheets closest to the pair of prism sheets intersects with the prism extending directions at an angle of 0° or more and 20° or less, or 70° or more and 90° or less.

2. The backlight unit of claim 1, wherein
   the shape of the plurality of recesses is a substantially inverted triangular pyramid or a substantially inverted hexagonal pyramid.

3. The backlight unit of claim 1, wherein
   a second arrangement direction of the plurality of recesses of a second diffusion sheet that is at least one of the plurality of diffusion sheets excluding the first diffusion sheet is substantially the same as the first arrangement direction.

4. The backlight unit of claim 1, wherein
   a second arrangement direction of the plurality of recesses of a second diffusion sheet that is at least one of the plurality of diffusion sheets excluding the first diffusion sheet is different from the first arrangement direction.

5. The backlight unit of claim 1, wherein
   the light sources are arranged on a reflection sheet provided on an opposite side of the display screen when viewed from the plurality of diffusion sheets.

6. A liquid crystal display device, comprising:
   the backlight unit of claim 1; and
   a liquid crystal display panel.

7. An information apparatus comprising: the liquid crystal display device of claim 6.

8. A method for manufacturing the backlight unit of claim 1, the method comprising:
   arranging the plurality of diffusion sheets between the light sources and the display screen; and
   arranging the pair of prism sheets between the plurality of diffusion sheets and the display screen,
   wherein in arranging the plurality of diffusion sheets, luminance uniformity is evaluated with various intersecting angles between an arrangement direction of the plurality of recesses of each of the plurality of diffusion sheets and the prism extending directions; and based on an evaluation result, the arrangement direction of the plurality of recesses of each of the plurality of diffusion sheets is determined.

* * * * *